US008488066B2

(12) United States Patent
Gao

(10) Patent No.: US 8,488,066 B2
(45) Date of Patent: Jul. 16, 2013

(54) SYSTEM AND METHOD FOR FAST DIGITAL CHANNEL CHANGING

(75) Inventor: Zhi Gao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1226 days.

(21) Appl. No.: 11/944,236

(22) Filed: Nov. 21, 2007

(65) Prior Publication Data

US 2008/0117336 A1 May 22, 2008

(30) Foreign Application Priority Data

Nov. 22, 2006 (CN) .......................... 2006 1 0144930

(51) Int. Cl.
*H04N 5/50* (2006.01)
(52) U.S. Cl.
USPC .......................................... 348/731; 725/95
(58) Field of Classification Search
USPC .......................................... 348/731; 725/95
See application file for complete search history.

(56) References Cited

U.S. PATENT DOCUMENTS

| 7,444,419 | B2 * | 10/2008 | Green ........................... 709/231 |
| 7,562,375 | B2 * | 7/2009 | Barrett et al. .................... 725/38 |
| 2004/0160974 | A1 * | 8/2004 | Read et al. ..................... 370/431 |
| 2006/0075428 | A1 | 4/2006 | Farmer et al. |
| 2007/0107026 | A1 * | 5/2007 | Sherer et al. .................... 725/97 |
| 2007/0171942 | A1 * | 7/2007 | Quinard ........................ 370/498 |
| 2008/0117336 | A1 | 5/2008 | Gao |
| 2009/0064242 | A1 * | 3/2009 | Cohen et al. .................... 725/90 |

FOREIGN PATENT DOCUMENTS

| CN | 1484450 A | 3/2004 |
| CN | 1647499 A | 7/2005 |
| CN | 1791200 A | 6/2006 |
| CN | 100550999 A | 5/2007 |
| EP | 1 487 215 | 12/2004 |
| WO | 2004/114668 | 12/2004 |
| WO | WO-2005/074290 A1 | 8/2005 |
| WO | WO-2006/044547 A2 | 4/2006 |
| WO | 2006/057938 | 6/2006 |

OTHER PUBLICATIONS

European Search Report for counterpart European Patent Application No. EP07121232, dated Feb. 6, 2008.
International Telecommunication Union, "Zapping Delay and Video Codec," Study Period 2005-2008, pp. 1-5 (2006).
European Office Action for Application No. 07121232.8, dated Oct. 29, 2009.
European Office Action for Application No. 07121232.8, dated Mar. 18, 2010.

* cited by examiner

*Primary Examiner* — Pankaj Kumar
*Assistant Examiner* — Charles N Hicks
(74) *Attorney, Agent, or Firm* — Slater & Matsil, L.L.P.

(57) ABSTRACT

Methods and systems for fast channel changing and for auxiliary channel generating are disclosed. The system for fast channel changing includes: an auxiliary channel generating unit, configured to generate one or more auxiliary channels corresponding to target channel and send video data of the one or more auxiliary channels; a client device, configured to receive video data from the target channel or from the one or more auxiliary channels; a video data receiving controller, configured to detect the video data received by the client device from the target channel or from the one or more auxiliary channels, and send a message of terminating receiving the video data from one of the target channel and the one or more auxiliary channels to the client device. That's the way to change channel fast, and the way occupies little resource of the network, and with little extra cost to be implemented.

21 Claims, 4 Drawing Sheets

SYSTEM AND METHOD FOR FAST DIGITAL CHANNEL CHANGING

BACKGROUND OF THE INVENTION

1. Field of the Technology

The invention relates in general to digital channel changing, or zapping, and more particularly, to a system and method for fast digital channel changing.

2. Background of the Technology

The digitatization of Television (TV) broadcast improves TV picture quality greatly, however, it causes a slowdown of channel changing.

This slow changing of digital channels involves the method used for digital video data compression. For example, Internet Protocol Television or Interactive Personal Television (IPTV) and Digital Television (DTV) generally apply a compression protocol, such as Moving Picture Experts Group Compression Standard Version 2(MPEG-2), H.264, Video-Codec 1(VC-1), or Audio Video coding Standard (AVS). The digital video data is transmitted in a series of frames, which includes intra frames (I-frames), predictive frames (P-frames) and bidirectional frames (B-frames). I-frame, also called 'key' frame, is an independent frame that may be decoded without reference to other video frames. P-frame is a predictive video frame. P-frame provides information about the occurred change compared to the previous I-frame. B-frame is a bidirectional frame. B-frame contains information of the change that occurred between the I-frame before and after it. B-frame and P-frame are dependent frames that are decoded with reference to one or more other video frames, such as I-frames.

Consecutive frames are displayed very near to each other in time. For example, in Phase Alternating Line (PAL) systems, the frame interval of the frames is 0.04 seconds, and most of the time, the consecutive frames are visually almost the same with little differences. P-frames and B-frames are more efficient than I-frames because they only encode the differences between frames. For this reason, the Broadcast Television (BTV) system uses less I-frames and more P-frames and B-frames to get a higher compression rate. The interval between I-frames is about 0.5 seconds and the frames may be in a sequence, such as IPPPPPPPPPPPI or IBBPBBPBBPBBPI. Because there are more P frames and B-frames than I-frames in data transmission, users have a high likelihood of changing channel of meeting P-frames or B-frames. Because P-frames or B-frames need to be decoded depending on previous I-frames, the users would have to discard the received P-frames or B-frames until an I-frame is received. This is the reason for the slow changing of digital channel.

One way of improving channel changing speed is to be accomplished by a storage device that retains broadcast video data for multiple channels, a video data extractor that accesses the retained broadcast video data and retrieves an intra frame (I-frame) of broadcast video data that is in the past for a requested channel; and a video data distributor that transmits the retrieved intra frame (I-frame) of broadcast video data.

The exemplary method is given as: detecting a channel change request that indicates a requested channel, the requested channel corresponding to a multicast group; and transmitting a retained intra frame for the requested channel as a unicast communication, thus makes the channel changing fast.

To change digital channel fast, the method should be accomplished with a storage device, a video data extractor, a video data distributor, etc., and these devices add cost to the broadcast video data service. At the same time, the unicast communication means every user would occupy the network bandwidth resources, server resources, or other resources, thus loses the benefit of multicast transmitted TV. The more users change channels, the more resources are occupied and wasted. Besides, the storage devices generally are fragile and in the complex procedures are easier to cause the changing failure.

Another way to solve digital channel changing proposes a method to reduce the delay by encoding a video sequence in two bitstreams of different spatial (or spatial and temporal). This contribution suggests encoding video in two layers, for example, a base layer and an enhancement layer, different in spatial resolution, wherein the base layer is a channel with low resolution and low bitrate and the enhancement layer is a normal channel with full resolution. The channel changing procedure requires to change to the base layer and then the enhancement layer of the channel, and to encode the base layer with, so more often Intra refreshing to reduce zapping delay The given method should apply two channels, which makes the cost of the encoder and the backbone network resource higher, and there is still appreciable degrade of video quality in digital channel changing.

These two ways in the conventional art may solve the problems of slowly channel changing in some extent, but they still have other shortcomings as stated above. Therefore, there is a need for a system and method for changing the channel fast.

Therefore, there is a need for a method and system to make the channel changing quickly.

SUMMARY OF THE INVENTION

An embodiment of the present invention provides a method for changing digital channel fast. The method includes the following processes: receiving a message of changing a digital channel to a target channel, receiving video data from the target channel and an auxiliary channel corresponding to the target channel and continuing receiving the video data from one of the target channel and the auxiliary channel.

Another embodiment of the present invention provides a method for generating an auxiliary channel. The method includes the following processes: modifying an address of a digital channel corresponding to a target channel, caching video data of the target channel in the digital channel and sending the video data.

Another embodiment of the present invention provides a system for changing digital channel fast. To accomplish digital channel changing, the system should include an auxiliary channel generating unit, a client device and a video data receiving controller.

To generate an auxiliary channel, a system, including a channel modifying unit, a caching unit, and a timing unit, is needed. This system for generating an auxiliary channel is also given in another embodiment.

Thus, with the auxiliary channel, the time for changing to a target channel is shortened.

BRIEF DESCRIPTION OF THE DRAWINGS

For a better understanding of the present invention, more details will be given hereinafter in conjunction with embodiments with reference to the accompanying figures

DETAILED DESCRIPTION OF THE PREFERRED EMBODIMENT

In the following description, embodiments of the invention will be described in detail with reference to the drawings.

Figure 1:
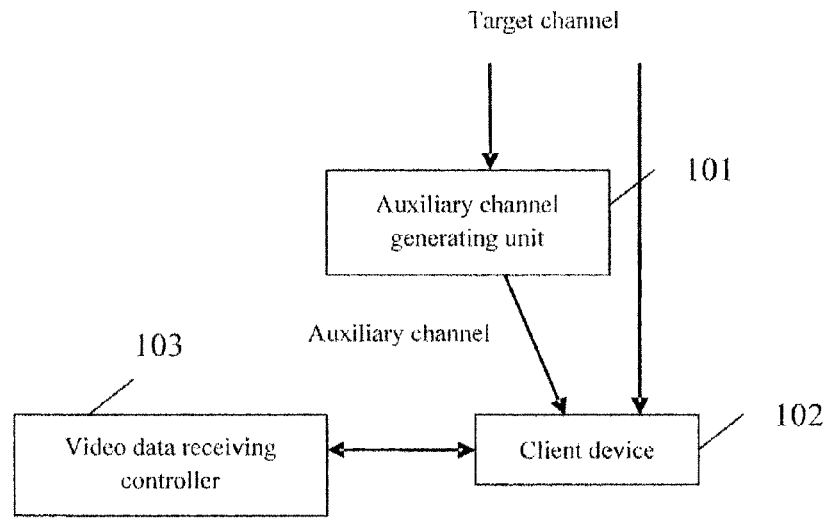
FIG. 1 is a block diagram illustrating an exemplary video distribution architecture that includes the basic components of the invention for fast channel changing.

FIG. 1 shows a block diagram of basic components for changing digital channels quickly by one or more auxiliary channels. With reference to FIG. 1, an embodiment of a last digital channel changing system includes an auxiliary channel generating unit 101, a client device 102 and a video data receiving controller 103. In FIG. 1, a target channel (the digital channel to be changed to) and an auxiliary channel corresponding to the target channel are shown, while other digital channels are not shown for the target channel. One or more auxiliary channels may be generated for a target channel. FIG. 1 shows one auxiliary channel, as an example.

Figure 6:
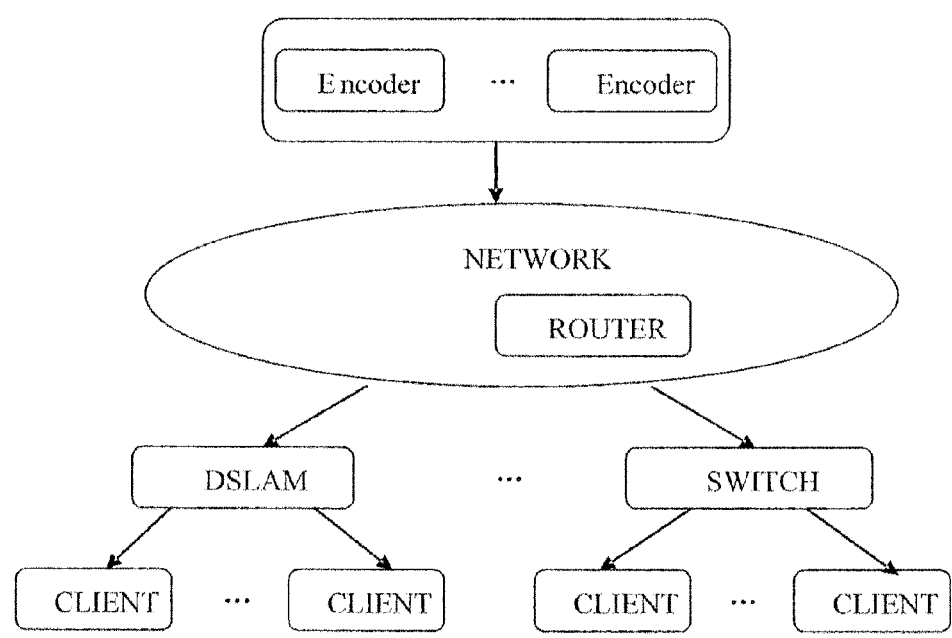
FIG. 6 is a block diagram illustrates an exemplary video distribution architecture including the basic components of the fast channel changing system and a network device capable of multicast communications.

The auxiliary channel generating unit 101 may be an independent device, such as an auxiliary channel generating device, or alternatively, it may be integrated into other devices, see FIG. 6. For example, in IPTV services, the auxiliary generating unit 102 may be set in a Digital Subscriber Liner Multiplexer (DSLAM), a switch, a router, etc. In DTV services, the auxiliary generating unit 102 may be set in the encoder; and in Mobile TV (MTV) services, also, the auxiliary generating unit 102 may be set in a wireless base station.

The auxiliary channel generating unit 101 is configured to generate one or more auxiliary channels. In IPTV, when the auxiliary channel generating unit 101 is an independent device, to generate an auxiliary channel, the multicast IP address of the target digital channel is modified, the video data of the target channel is cached, and the video data is sent to a delayed channel, the auxiliary channel. In this embodiment of the invention, one auxiliary channel is shown. Generally speaking, more auxiliary channels may be generated in a similar way. The detail of generating the auxiliary channel would be described hereinafter.

The process of modifying the multicast IP address of the digital channel may be implemented at any time before sending the video data out, for example, modifying the address and then caching the video data; or caching the video data and then modifying the address. The method of modifying the address of the digital channel is various in different environments. For example, in IPTV services, the digital channel is modified by changing the Internet Protocol (IP) address and/or the port number of the digital channels. In MTV services, the digital channel is modified in a way similar to IPTV services. In DTV services, the digital channel is modified by changing the Process ID (PID).

In one embodiment the process of caching the video data of the target channel is implemented in a Random Access Memory (RAM). As an alternative way, the process of cashing may be implemented in magnetic disks.

The client device 102 receives both the video data of the target channel and the video data of the auxiliary channel at the same time. The client device 102 releases the auxiliary channel upon receiving a notice from the video data receiving controller 103 of stopping receiving the video data from the auxiliary channel, and continues to receive the video data from the target channel.

The video data receiving controller 103 detects the video data that is sent to the client device 102 from both, the target channel and the auxiliary channel. When, the first video data package of the target channel links up with the last video data package of the auxiliary channel, the video data receiving controller 103 sends a notice to the client device 102 to stop receiving the video data of the auxiliary channel.

The video data receiving controller 103 may be an independent device or integrated into other devices. In one embodiment, the video data receiving controller 103 is set in the client device.

Figure 2:
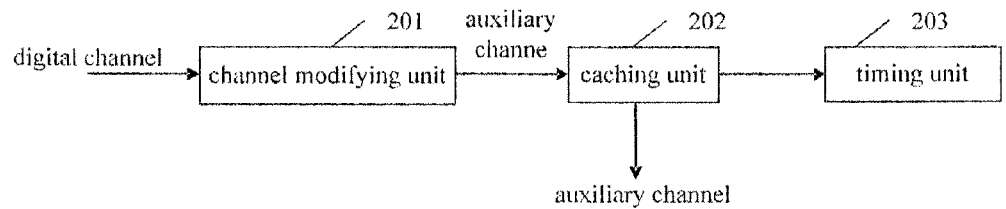
FIG. 2 is a block diagram showing the basic components of generating an auxiliary channel according to an embodiment of the invention.

Referring to FIG. 2, in one embodiment, an auxiliary channel generating device 101 includes channel modifying unit 201 and caching unit 202, and in other cases may also include a timing unit 203. The channel modifying unit 201 modifies the multicast IP address of a digital channel corresponding to the target channel to generate an auxiliary channel.

The way of modifying the target digital channel to be the auxiliary channel is various in different environments. For example, in IPTV services, the way of modifying is to change the IP address and/or the port number of the digital channels; in MTV services, the way of modifying is similar to the ways in IPTV services; in DTV services, the way of modifying is to change the PID.

The channel modifying unit 201 modifies the target digital channel to generate the auxiliary channel, and sends the video data of the auxiliary channel when the predetermined sending conditions are met. The sending conditions may be receiving a notice from a timing unit 203 when a preset sending time has reached, or the amount of the cached video data has reached a preset quantity.

In one embodiment of the invention, the caching unit 202 may cache the video data of the target digital channel in a Random Access Memory (RAM), and as an alternative, the caching unit 202 may cache the video data of the target digital channel in magnetic disks.

The timing unit 203 presets the amount of delay for the video data of the auxiliary channel, and sends a notice to the caching unit 202 of sending the video data when the preset delay time is out.

In this embodiment, the number of auxiliary channels corresponding to the target channels may be one or more according to different requirements, such as the changing time or the network resource. One of ordinary skill, in the art would recognize that more auxiliary channels have the similar way of implementation, in this embodiment, one auxiliary channel would be stated in detail. When there are more auxiliary channels, the delay time should be set for each, and the delay time may be in geometric progression growth.

Figure 3:
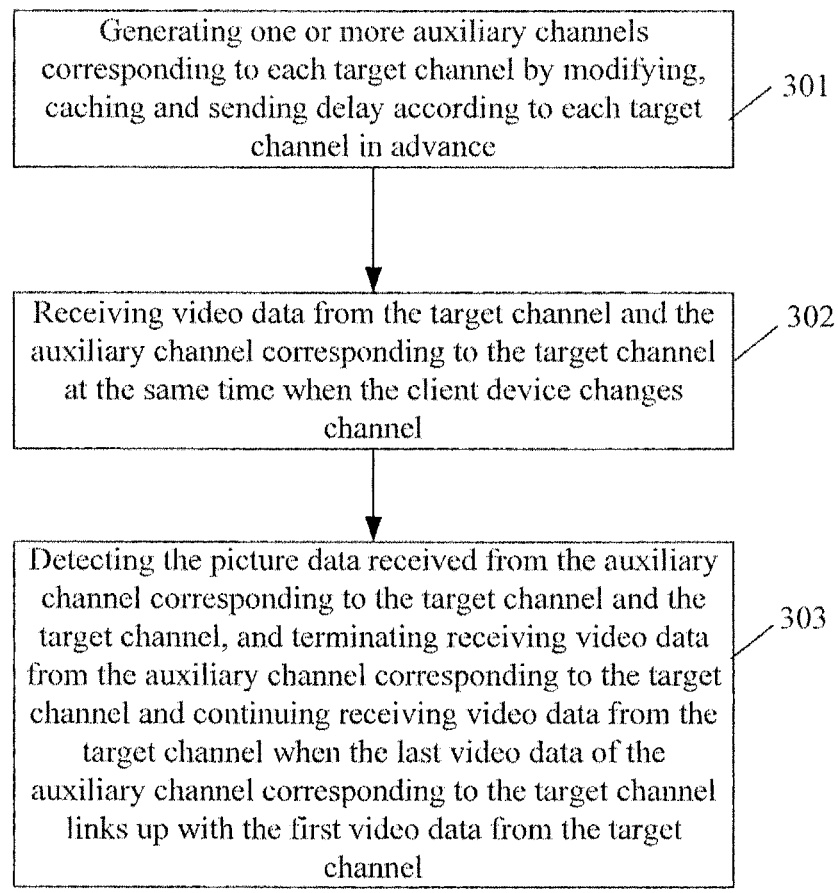
FIG. 3 is a flow chart for fast changing of digital channels, or zapping, according to an embodiment of the invention.

In FIG. 3, a flow chart for digital channel fast changing is provided according to an embodiment, wherein a client changes to a new digital channel, called target channel hereinafter. The process of fast channel changing includes:

Block 301: Generate an auxiliary channel. Generating an auxiliary channel needs to modify the multicast IP address of the target digital channel, cache the video data in the digital channel and send the video data later.

The process of generating the auxiliary channel may be implemented in a network side (also called server side. The other side is the client side). In this embodiment, the video data is cached in RAMs, and a delay time is provided in a range of 0.1 seconds to 9.9 seconds. To insure proper decoding, all the video data received from the target channel and the auxiliary channel has at least one I-frame during the sending delay time. The delay time of the auxiliary channel should be half the interval of the I-frame. Shorter delay time is also acceptable, but maybe there is no I-frame within the parallel caching time; longer delay time is also acceptable, but the client device would have an unnecessary longer parallel caching time.

According to the embodiments of the invention, it is not necessary to use additional magnetic disks or encoders and many servers, so the cost of the system is low.

Because the sending delay time of each digital channel is calculated in seconds, in an embodiment, the video data is caches in RAMs, and also may cache in magnetic disks as an alternative way.

The purpose of generating the auxiliary channel is to make the client device receive the video data from both the target channel and the auxiliary channel corresponding to the garget channel at the same time when the client device changes to the target channel. Therefore the time of receiving the video data is shorter. One or more auxiliary channels may be generated as desired. The more auxiliary channels are used, the fester the channel change is.

In this specification, take one auxiliary channel as an example stated in detail. More auxiliary channels may be implemented in a similar way. And when more auxiliary channels are generated, for example, N auxiliary channels may be generated. Caching the video data in more channels separately, the sending delay time of the No. N auxiliary channel is set as N times the sending delay time of the first auxiliary channel. For example, the sending delay time of the first auxiliary channel is 1 second; the sending delay time of the second auxiliary channel is 2 seconds; the sending delay time of the third auxiliary channel is 3 seconds; . . . , and the delay time of Nth auxiliary channel is N seconds. In another example, the sending delay time of the first auxiliary channel is 0.5 seconds; the sending delay time of the second auxiliary channel should be 1.0 second; the sending delay time of the third auxiliary channel is 1.5 seconds; . . . , and the sending delay time of Nth auxiliary channel is 0.5*N seconds.

Block 302: Receive the video data from the target channel and the auxiliary channel. There may be one or more auxiliary channels. In this embodiment, one auxiliary channel is used.

When changing channels, the client device 102 stops receiving video data from the current digital channel by leaving the corresponding multicast group, and starts to receive the video data from the target channel and the auxiliary channel by joining the corresponding multicast groups. The operations may be initiated in different orders. The orders are sent so fast that the reception of the video data from the target channel and the reception of the video data from the auxiliary channel may be treated as being at the same time. In practice, one of ordinary skill in the art would know, suitable adaptation may be permitted, e.g., the client device 102 terminating receiving the video data from the current digital channel, receiving the video data from the auxiliary channel, and receiving the video data from the target channel. The specific sequence may be adapted as desired.

Block 303: Detect the video data received from the auxiliary channel and the video data received from the target channel. When the last video data package of the auxiliary channel concatenates in sequence with the first video data package of the target channel, the client device terminates the reception of the video data from the auxiliary channel and continues to receive the video data from the target channel.

While there are more auxiliary channels, and because the sending delay time of the Nth auxiliary channel is N times that of the first auxiliary channel, i.e., the difference between sending delay time of neighboring auxiliary channels is the same. The last video data package of the first auxiliary channel may be concatenated with the first video data package of the target channel. In other words, the last video data package of the Nth auxiliary channel may be concatenated with the first video data package of the (N+1)th auxiliary channel. So, when the last video data package of the auxiliary channels links up with the first video data package of the target channel, terminate receiving the video data of the auxiliary channels and continues receiving the video data of the target channel.

As stated above, the embodiments of the invention are based on digital broadcast/multicast TV technology other than Video On Demand technology. One channel occupies only one bandwidth of the backbone network, thus requires less network resources than Video On Demand which is based on unicast and requires one bandwidth for every subscriber.

In one embodiment, the client device 102 does not need to query I-frame from a headend device, so the method of the embodiments may be used in IPTV, bi-directional DTV, and unidirectional DTV.

Figure 4:
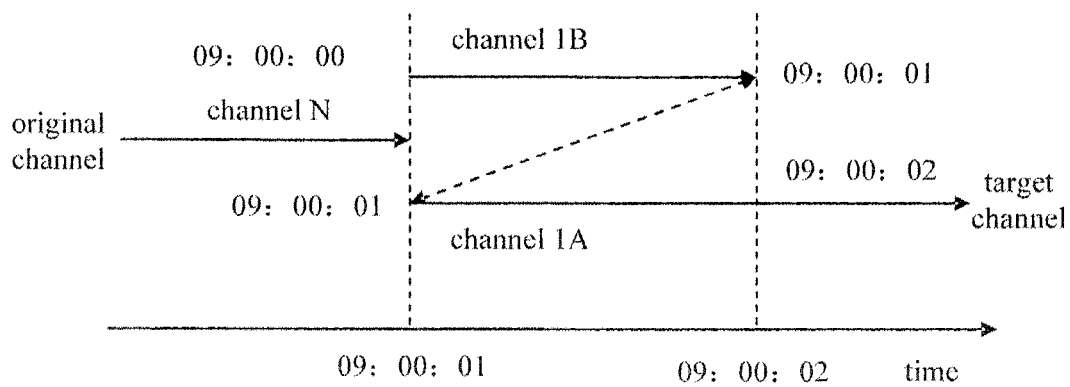
FIG. 4 is an example of digital channel changing according to an embodiment of the invention.

In order to explain the process of fast channel changing, more specific examples are given. It should be understood that the examples are not used to limit the invention. In these examples, a client device 102 wants to change the current channel N to the target channel 1A. The client device 102 receives video data from the target channel 1A, while receives video data from an auxiliary channel 1B corresponding to the target channel 1A. The auxiliary channel 1B is pre-generated from channel 1A. The way of generating the auxiliary channel 1B is to modify the multicast IP address of the video data of the target channel 1A, cache the video data in memories, and send the video data later, for example, in 1 second. In this example, one auxiliary channel is generated, as shown in FIG. 3 and FIG. 4, which illustrate the procedures of fast channel changing.

In one embodiment, the channel changing happens at 09:00:01 and the delay time is 1 second. The video data received from the target channel 1A is started from 09:00:01, and the video data received from the auxiliary channel 1B is started from 09:00:00 (because the delay time is 1 second). The client device 102 receives the video data from both the target channel 1A and the auxiliary channel 1B at the same time, from 09:00:01 to 09:00:02 (for 1 second), the video data of 09:00:00 to 09:00:02 is received from auxiliary and target channel. At 09:00:02, the first video data package of the target channel 1A links up with the last video data package of the auxiliary channel 1B, which is shown in FIG. 4 by a dashed arrowhead. The client device 102 may begin decoding when enough video data has been received. The data receiving speed doubles that of the traditional way which has no auxiliary channel, so the video data receiving time is ½ of the original time. In other words, the channel changing is twice as fast as the original channel changing.

And according to the block diagram given in FIG. 1, there is another method to make the digital channel changing fast. The Video data receiving controller 103 detects the video data received from the target channel and the auxiliary channel. When an I-frame is received, either from the target channel or from the auxiliary channel, the client device continues to receive video data of the channel where the I-frame is received, and stops to receive video data from the other channel. In other words, if an I-frame is received from the target channel firstly, continue receiving the video data from the target channel and release the auxiliary channel. On the other hand, if an I-frame is received from the auxiliary channel firstly, continue receiving the video data from the auxiliary channel and release the target channel. In this embodiment, the target channel and the auxiliary channel are the same as that of the above embodiment. The reason of the method making the digital channel changing faster lies in: the video data received from the target channel and the auxiliary channel is twice as much as the video data received from the target channel only in traditional way, so the time of receiving the first I-frame is shortened.

There may be more auxiliary channels in these embodiments in an alternative embodiment. If there are two auxiliary channels generated, the first auxiliary channel delays 1 second, and the second auxiliary channel delays 2 seconds. When changing channels, the client device 102 receives the video data from three channels: the first auxiliary channel, the second auxiliary channel and the target channel. In 1 second, the amount of video data received is the amount transmitted in 3 seconds, and the receiving speed is triple of the traditional method.

The method described in the above embodiments of the present invention may be used in different services such as IPTV, DTV, and MTV, and are given in more details blow.

Figure 5:
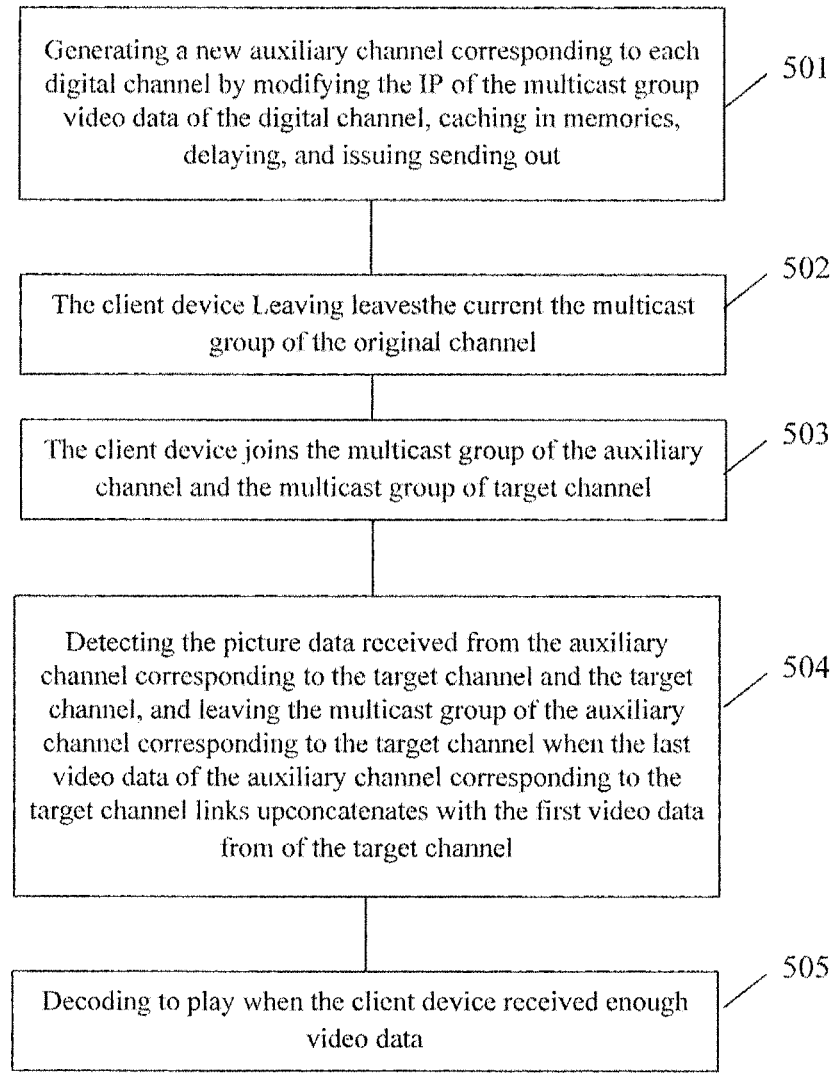
FIG. 5 is a flow chart of fast changing of digital channels in IPTV according to an embodiment of the invention.

In IPTV service, the encoder in the headend outputs a digital channel to the network by IP multicast or unicast. The client device 102 accesses the network through network devices, such as a DSLAM, a switch, a router or Passive Optical Network (PON), to receive the data, of the digital channel. When changing channels, the client device 102 leaves the current digital channel (multicast group) and joins a new digital channel (target channel) via communication with network devices, such as a DSLAM or a switch, by Internet Group Management Protocol (IGMP). According to FIG. 5, a flow chart of fast digital channel changing in IPTV is shown.

Fast digital channel changing in IPTV services may be implemented by the following processes:

Block 501: Generate an auxiliary channel in advance. Generating an auxiliary channel needs to modify the multicast IP address of the multicast group corresponding to the target channel, cache the video data of the target channel in memories and send the video data later. For example, mark the multicast IP of channel_1 as IP_1A, may simply add 1 to the one byte (such as the last byte) of IP_1A to form the auxiliary channel of channel_1, and mark it as IP_1B; similarly, mark the multicast IP of channel_2 as IP_2A, may simply add 1 to the one byte (such as the last byte) of IP_2A to form the auxiliary channel of channel_2, and mark it as IP_2B, and so on.

Block 502: The client device 102 leaves the multicast group of the current digital channel.

In IPTV services in the embodiments, the video data received is IP datagram, the transmission format of the video data may be in IP, Transfer Control Protocol (TCP), User Datagram Protocol (UDP), Real Time Transfer Protocol (RTP), or Transfer Scream (TS).

Block 503: The client device 102 joins the multicast group of the auxiliary channel and the multicast group of the target channel.

In this process, the using of the multicast group of the auxiliary channel in the client device should be in accordance with the rule of generating the auxiliary channel in Block 501. For example, when the client device 102 changes channel from channel N to channel 1, the client device 102 leaves the multicast group with the IP address of IP nA, and joins the multicast groups with the IP address of IP 1A and IP 1B. The client device 102 may add 1 to the IP address of the target channel (IP 1A) based on locally configured rules to get the IP address of auxiliary channel (IP 1B), or get the IP address of the target channel (IP 1A) from other devices, such as Electronic Program Guide devices (EPG). The latter approach of getting the auxiliary channel information provides more flexibility, for example, when changing the rule of generating the auxiliary channel, it is only needed to make changes in EPG, thus avoiding the arduous work of upgrading each client device which is distributed in a wide area and is of a huge amount.

In this process, the video data received by the client device 102 is the video data from the target channel and the auxiliary channel.

Block 504: Detect the video data received from the auxiliary channel and the video data received from the target channel; when the last video data package of the auxiliary channel concatenates with the first video data package of the target channel, the client device leaves the multicast group of the auxiliary channel, terminates receiving the video data from the auxiliary channel, and continues receiving the video data from the target channel.

The way to determine whether the last video data package of the auxiliary channel links up with the first video data package of the target channel is varied according to system requirements. For example, if the transmission mode is IP/UDP/RTP, the determining may be done based on RTP sequence number.

And alternatively, detect the video data received from the target channel and the auxiliary channel. If an I-frame is firstly received from the target channel, the client device continues receiving the video data from the target channel and releases the auxiliary channel. Similarly, if an I-frame is firstly received from the auxiliary channel, the client device continues receiving the video data from the auxiliary channel and releases the auxiliary channel.

Block 505: The client device 102 decodes to play the video data after enough video data is received.

In case of one auxiliary channel, the speed of receiving the video data during the channel changing is 2 times of the traditional changing (no auxiliary channel), so the time of the channel changing is ½ of the time of traditional changing. If there are more auxiliary channels, for example N, the speed of the reception of the video data during the channel changing is N+1 times of the traditional changing, so the time of channel changing is 1/N of the time of the traditional changing.

In these embodiments, the channel generating unit may be integrated into a network device, such as a DSLAM, a switch, or a router, or be an independent device. The Video data receiving controller may be set in client device as a preferred embodiment, or alternatively set as an independent device.

The method of the embodiment of the invention may also be implemented in DTV services. The process is similar to the process in IPTV services. In different services, one of ordinary skill in the art may recognize that the method may be adapted as desired.

The method may be adapted as follows:

In DTV services, the IP multicast cannot be transmitted directly, and the digital television signal is transmitted between the encoder and the client device in TS with modulation. In IPTV services, in changing channels need to control the joining or leaving of the multicast group. In DTV services, the TS video data is sent by modulation. The client device requires to tune to the corresponding frequency to receive the video data of the specified PID. So, the generating auxiliary channel is implemented by modifying the PID.

To the unidirectional network DTV, this method of the embodiment may be also carried out, that's because the method of the embodiment does not need to query I-frame from the headend device.

The method of the embodiment of the invention may also be implemented in MTV services. The process is similar to the process in IPTV and DTV services. In different services, one of ordinary skill in the art may recognize that the method may be adapted as desired.

The method may be adapted as follows:

In MTV services, the network is a wireless network rather than an IP network. The network device is a wireless base station rather than a DSLAM or a router, and the client device is a cell phone rather than a Set Top Box (STB). These devices are given as examples to show the different services and do not limit the scope of the invention.

In MTV services, the video data may be transmitted by unicast, multicast or broadcast. This invention applies to multicast or broadcast only. The generating auxiliary channels may be implemented via modifying the IP address of the target channel as an embodiment. Alternatively, the generating auxiliary channels may be implemented by modifying PID.

In MTV services, the client device may use General Packet Radio Service (GPRS) protocol, $3^{rd}$ Generation Mobile Telecommunication System (3G), $4^{th}$ Generation Mobile Telecommunication System (4G), Worldwide Interoperability for Microwave Access or other wireless telecommunication protocol. In MTV services, the video data, is the data packet in ISMA, TS, 3GPP or EDGE format buried on GPRS, 3G, 4G, WiMAX, or other wireless network.

The descriptions of the embodiments described above are set forth for illustrative purposes and are not intended to limit the present invention in any manner. Equivalent approaches are intended to be included within the scope of the present invention. While the present invention has been described with reference to the particular embodiments illustrated, those skilled in the art will recognize that many changes and variations may be made thereto without departing from the spirit and scope of die present invention. These embodiments and obvious variations thereof are contemplated as falling within the scope and spirit of the claimed invention.

What is claimed is:

1. A system for changing digital channel, the system comprising:
    an auxiliary channel generating unit, configured to generate one or more auxiliary channels carrying cached video data that is identical to video data carried by a target channel, and to simultaneously send the video data of the target channel and the cached video data of the one or more auxiliary channels to a client device, wherein the target channel and the auxiliary channel are both multicast channels addressed to a multicast group of client devices and not to individual client devices;
    the client device, configured to receive the video data carried by the target channel and the cached video data carried from the one or more auxiliary channels at the same time when the client device changes to the target channel; and
    a video data receiving controller, configured to detect the video data received by the client device from the target channel or from the one or more auxiliary channels, and to send a message of terminating receiving the video data from one of the target channel or the one or more auxiliary channels to the client device upon either detecting that a first video data package received over the target channel concatenates in sequence with a last video data package received over the one or more auxiliary channels or detecting that an I-frame is received over the target channel or the one or more auxiliary channels.

2. The system according to claim 1, wherein the auxiliary channel generating unit is set in a network device or an encoder, and wherein the video data receiving controller is set in a network access device or the client device.

3. A method for changing digital channel, the method comprising:
    receiving, by a client device, a message of changing a digital channel to a target channel;
    receiving, by the client device, video data carried by the target channel and cached video data carried by an auxiliary channel, the cached video data carried by the auxiliary channel being identical to the video data carried by the target channel, wherein the target channel and the auxiliary channel are both multicast channels addressed to a multicast group of client devices and not to individual client devices; and
    terminating, by the client device, receipt of one of the video data carried by the target channel and the cached video data carried by the auxiliary channel upon receiving a termination instruction from a video data receiving controller, the termination instruction being received when either a first video data package received over the target channel concatenates in sequence with a last video data package received over the auxiliary channel or when an I-frame is received over the target channel or the auxiliary channel.

4. The method according to claim 3, further comprising:
    detecting, by the video data receiving controller, that a last video data package of the auxiliary channel concatenates in sequence with a first video data package of the target channel;
    terminating, by the client device, receiving the video data of the auxiliary channel when receiving the message of terminating receiving the video data from the video data receiving controller; and
    continuing, by the client device, receiving the video data from the target channel.

5. The method according to claim 3, further comprising:
    detecting, by the video data receiving controller, that an I-frame is received from the target channel or from the auxiliary channel; and
    continuing receiving, by the client device, the video data of one channel from which the I-frame is received and terminating, by the client device, receiving the video data from the other channel.

6. The method according to claim 3, further comprising:
    generating, by an auxiliary channel generating unit, one or more auxiliary channels corresponding to the target channel by modifying addresses of one or more digital channels corresponding to the target channel, caching video data of the target channel for the one or more auxiliary channels, sending the video data of the target channel, and sending video data of the one or more auxiliary channels when a corresponding preset sending time has reached, or the amount of the cached video data has reached a corresponding preset quantity.

7. The method according to claim 6, wherein the video data is cached in a Random Access Memory (RAM).

8. A method for generating an auxiliary channel, the method comprising:

modifying an address of a digital channel corresponding to a target channel to generate one or more auxiliary channels;

caching video data of the target channel in the digital channel for the one or more auxiliary channels; and simultaneously sending the video data of the target channel and the cached video data of the one or more auxiliary channels to a client device, wherein each of the target channel and the one or more auxiliary channels are multicast channels addressed to a multicast group of client devices and not to individual client devices; and cease sending video data over the target channel or the one or more auxiliary channels upon receiving a termination instruction, the termination instruction being received when either a first video data package received over the target channel concatenates in sequence with a last video data package received over the one or more auxiliary channels or when an I-frame is received over the target channel or the one or more auxiliary channels.

9. The method according to claim 8, wherein the process of caching is implemented in a memory.

10. The method according to claim 8, wherein there are a plurality of auxiliary channels and the preset sending time of the Nth auxiliary channel is N times of the preset sending time of the first auxiliary channel, wherein the N is a natural number.

11. The method according to claim 8, wherein in an Interactive Personal Television (IPTV) service, the process of modifying the target channel comprises:

modifying an IP address of the target channel or a port number.

12. The method according to claim 8, wherein in a Digital Television (DTV) service, the process of modifying the target channel comprises:

modifying the Process ID (PID) of the transmission stream in the target channel;

modifying the IP address of the target channel or a port number; or modifying modulation frequency.

13. The method according to claim 8, wherein in a Mobile TV (MTV) service, the process of modifying the target channel comprises:

modifying the IP address of the target channel or a port number, modifying the PID of the target channel; or modifying modulation frequency.

14. An apparatus comprising:

a processor; and a computer readable storage medium storing programming for execution by the processor, the programming including instructions to:

generate an auxiliary channel carrying cached video data that is identical to video data carried by a target channel, wherein the auxiliary channel corresponds to a time-delayed version of the target channel; and pursuant to an instruction to switch to the target channel, simultaneously send the video data of the target channel and the cached video data of the auxiliary channel to a client device, wherein the target channel and the auxiliary channel are both multicast channels addressed to a multicast group of client devices and not to individual client devices; and cease sending video data over the target channel or the auxiliary channel upon receiving a termination instruction, the termination instruction being received when either a first video data package received over the target channel concatenates in sequence with a last video data package received over the auxiliary channel or when an I-frame is received over the target channel or the auxiliary channel.

15. The apparatus according to claim 14, wherein the programming including instructions to send a message instructing the client device to stop receiving the cached video data of the auxiliary channel if a first video data package of the target channel concatenates in sequence with a last video data package of the channel.

16. The apparatus according to claim 14, wherein the programming including instructions to send a message instructing the client device to stop receiving the video data of the target channel if an inter-coded frame (I-frame) is received from the auxiliary channel prior to being received from the target channel.

17. The system of claim 1, wherein the cached video data carried by the one or more auxiliary channel and the video data carried by the target channel comprise identical content, and wherein the auxiliary channel corresponds to a time-delayed version of the target channel.

18. The system of claim 1, wherein the auxiliary channel generating unit is configured to generate the one or more auxiliary channels by modifying addresses of one or more digital channels corresponding to the target channel.

19. The method of claim 3, wherein the cached video data carried by the auxiliary channel and the video data carried by the target channel comprise identical content, and wherein the auxiliary channel corresponds to a time-delayed version of the target channel.

20. The method of claim 8, wherein the cached video data of the auxiliary channel is buffered for a delay period of between 0.1 seconds and 9.9 seconds before being sent to the client device, the delay period corresponding to a preset sending time or to a length of time required to buffer a preset quantity of the cached video data.

21. The method of claim 8, wherein the cached video data carried by the one or more auxiliary channel and the video data carried by the target channel comprise identical content, and wherein the auxiliary channel corresponds to a time-delayed version of the target channel.

* * * * *